(12) United States Patent  
Santos

(10) Patent No.: US 12,239,170 B2  
(45) Date of Patent: Mar. 4, 2025

(54) TEMPERATURE DETECTION FOR VAPORIZATION DEVICES

(71) Applicant: Rodrigo Escorcio Santos, Rockville, MD (US)

(72) Inventor: Rodrigo Escorcio Santos, Rockville, MD (US)

(*) Notice: Subject to any disclaimer, the term of this patent is extended or adjusted under 35 U.S.C. 154(b) by 261 days.

(21) Appl. No.: 17/520,833

(22) Filed: Nov. 8, 2021

(65) Prior Publication Data  
US 2022/0151307 A1 May 19, 2022

Related U.S. Application Data

(60) Provisional application No. 63/115,081, filed on Nov. 18, 2020.

(51) Int. Cl.  
*A24F 42/10* (2020.01)  
*A24F 42/60* (2020.01)  
*G01J 5/00* (2022.01)  
*G01J 5/02* (2022.01)  
*F23D 14/38* (2006.01)

(52) U.S. Cl.  
CPC .............. *A24F 42/10* (2020.01); *A24F 42/60* (2020.01); *G01J 5/0018* (2013.01); *G01J 5/0265* (2013.01); *G01J 5/028* (2013.01); *F23D 14/38* (2013.01)

(58) Field of Classification Search  
CPC .................................. A24F 42/10; A24F 42/60  
See application file for complete search history.

(56) References Cited

U.S. PATENT DOCUMENTS

| | | |
|---|---|---|
| 10,690,553 B1 | 6/2020 | Miller |
| 2017/0055579 A1* | 3/2017 | Kuna .................. A24F 1/00 |
| 2019/0261689 A1* | 8/2019 | Bowen ................ A61M 15/06 |

* cited by examiner

*Primary Examiner* — Christopher M Rodd  
*Assistant Examiner* — Jennifer A Kessie  
(74) *Attorney, Agent, or Firm* — Edell, Shapiro & Finnan, LLC

(57) ABSTRACT

A temperature sensing unit for a vaporization device is disclosed. The temperature sensing unit includes a main body, a flange extending radially from the main body, a receiver extending axially from the main body, temperature sensor disposed in or on the main body, an annular disk configured to be concentric with the receiver, a groove extending radially along a portion of the annular disk.

19 Claims, 3 Drawing Sheets

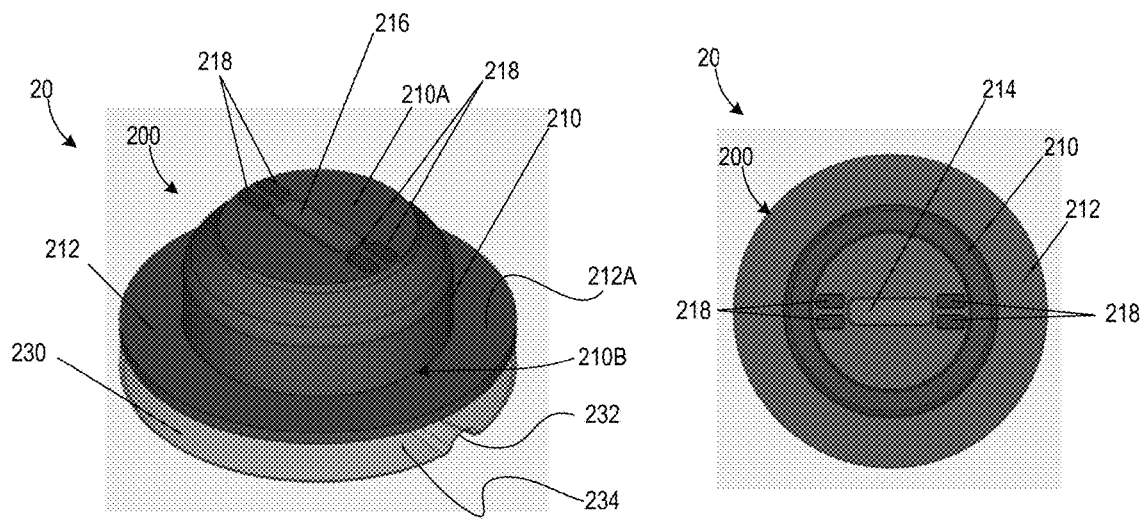
FIG. 2A
FIG. 2B
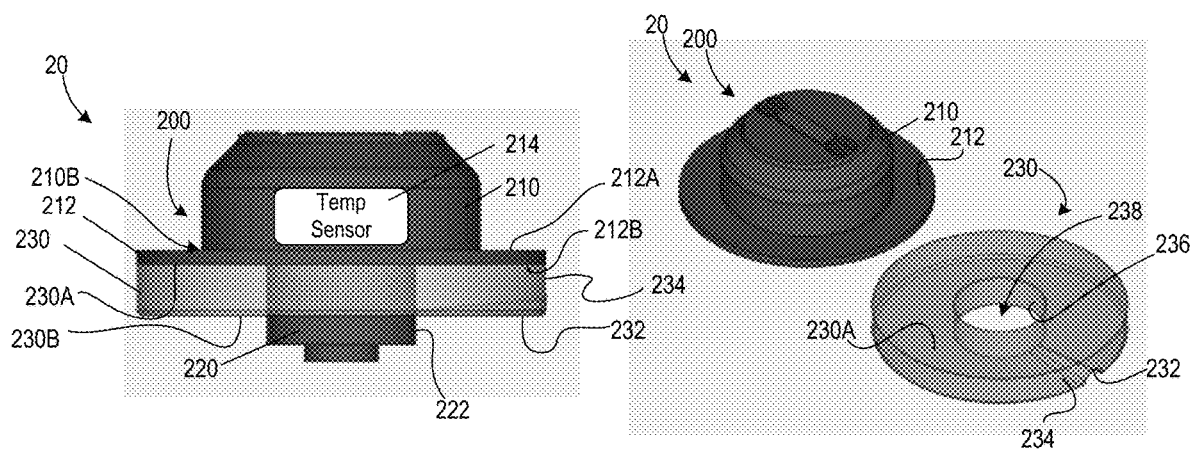
FIG. 2C
FIG. 2D

TEMPERATURE DETECTION FOR VAPORIZATION DEVICES

PRIORITY CLAIM

This application claims priority under 35 U.S.C. § 119(e) to U.S. Provisional Patent Application Ser. No. 63/115,081, entitled "Temperature Detection for Heating or Combustion Torches," filed Nov. 18, 2020, the disclosure of which is incorporated herein by reference in its entirety for all purposes.

FIELD OF INVENTION

The present invention is directed toward heating devices, and in particular, to a temperature detection unit for a heating device, such as vaporization devices commonly used for vaping and/or smoking consumables.

BACKGROUND

Handheld combustion and/or heating torches (i.e., non-cutting/processing torches) are often used for personal and household needs, such as to cause combustion (e.g., light a candle, cigar, etc.), heat a surface, or food substance. For example, handheld combustion and/or heating torches are sometimes called for in culinary recipes, such as crème brûlée recipes, that require exposure to a flame or a very hot heat source. As another specific example, handheld combustion and/or heating torches (for simplicity, referred to herein as "heating torches") may often be used to combust substances for smoking (e.g., in place of a lighter), heat substances for vaporization, or other similar uses.

In fact, in view of developments in technology and the law, vaporization devices have become quite popular and torches are often used to heat substances disposed in these devices to create an inhalable vapor within the vaporization device. That is, often, a user may use a heating torch to heat a consumable and/or inhalable product, such as oils, concentrates, and/or combustible plant substances to create a vapor for a user to inhale. Heating liquid or wax consumables has become particularly popular since liquids and waxes may be more concentrated and/or specialized as compared to plant substances. Additionally, a quantity of wax or liquid may last longer than a similar quantity of plant substance (which may further decrease the amount of materials that a vaporization user needs to carry). However, if vaporizable substances are heated above a threshold temperature, the vaporizable substances may burn instead of releasing an aromatic vapor. Burning the substances may create harmful particulates, such as tars, that users are often trying to avoid when choosing to vape in place of smoking. In view of at least the foregoing, improvements in temperature control are desired.

SUMMARY

The present application is directed to techniques that provide temperature detection of a surface on which a heating and/or combustion torch is or will be acting. The techniques may be embodied in the form of a temperature sensing unit that is removably coupleable to a vaporization device. Additionally, the techniques may be embodied in the form of a carb of a vaporization device that includes components configured to sense a temperature of a surface that contacts and heats a consumable (e.g., a surface on which a torch may act).

In some aspects, the techniques described herein relate to a vaporization device including: a main body; a nail including a nail receptacle for an inhalable substance and defining a heatable portion; a mouthpiece in fluid communication with the nail receptacle to allow vapor to pass from the nail receptacle to the mouthpiece; a heating element aligned with the heatable portion; and a carb cap configured to removably engage the nail receptacle, the carb cap including a temperature sensor configured to detect a temperature of the nail receptacle.

In some aspects, the techniques described herein relate to a vaporization device, wherein the temperature sensor detects the temperature of a portion of the nail receptacle proximate to the heatable portion.

In some aspects, the techniques described herein relate to a vaporization device, wherein the main body is configured to receive a liquid and defines pathways through or adjacent to the liquid that allow the vapor to pass from the nail receptacle to the mouthpiece.

In some aspects, the techniques described herein relate to a vaporization device, wherein the carb cap further includes: a display configured to display the temperature detected by the temperature sensor; and a battery configured to power the temperature sensor and the display.

In some aspects, the techniques described herein relate to a vaporization device including: a carb cap configured to cover a nail receptacle defined by a nail, the nail receptacle being configured to hold a consumable; and a temperature sensor configured to detect a temperature of an inner surface of the nail receptacle.

In some aspects, the techniques described herein relate to a vaporization device, wherein the temperature sensor includes a contactless temperature sensor.

In some aspects, the techniques described herein relate to a vaporization device, wherein the carb cap includes: an annular disk having a fluid channel, the annular disk configured to align the temperature sensor with the nail, and guide fluid into the nail receptacle via the fluid channel.

In some aspects, the techniques described herein relate to a vaporization device, wherein the carb cap further includes: a main body; and a temperature probe coupled to the temperature sensor, wherein the temperature probe extends from the main body towards the inner surface of the nail receptacle.

In some aspects, the techniques described herein relate to a vaporization device, wherein the main body further includes a threaded hole, and a proximal end of the temperature probe is threaded into the threaded hole.

In some aspects, the techniques described herein relate to a vaporization device, wherein the temperature probe is configured to contact at least one of the inner surface of the nail receptacle and the consumable.

In some aspects, the techniques described herein relate to a vaporization device, wherein the carb cap further includes: a display configured to display the temperature of the inner surface detected by the temperature sensor.

In some aspects, the techniques described herein relate to a vaporization device, the carb cap further includes one or more actuators disposed on the main body that are configured to control at least one of the temperature sensor and the display.

In some aspects, the techniques described herein relate to a vaporization device, further including: a battery disposed in the main body and configured to power the display and the temperature sensor.

In some aspects, the techniques described herein relate to a carb cap for a vaporization device including: a main body;

a flange extending radially from the main body; a receiver extending axially from the main body; a temperature sensor disposed in or on the main body; an annular disk configured to be concentric with the receiver; and a groove extending radially along a portion of the annular disk.

In some aspects, the techniques described herein relate to a carb cap, further including a display configured to display a temperature detected by the temperature sensor.

In some aspects, the techniques described herein relate to a carb cap, wherein the temperature sensor is a contactless temperature sensor.

In some aspects, the techniques described herein relate to a carb cap, wherein the receiver includes a threaded hole configured to: receive a proximal end of a temperature probe, and thermally and/or electrically couple the temperature probe to the temperature sensor.

In some aspects, the techniques described herein relate to a carb cap, wherein: the temperature probe axially extends from the threaded hole; and the temperature probe is configured to contact at least one of an inner surface of a receptacle and a consumable disposed in the receptacle.

In some aspects, the techniques described herein relate to a carb cap, wherein the annular disk is configured to engage a nail of the vaporization device.

In some aspects, the techniques described herein relate to a carb cap, wherein the annular disk is further configured to align the temperature sensor with the nail of the vaporization device.

BRIEF DESCRIPTION OF THE DRAWINGS

To complete the description and in order to provide for a better understanding of the present invention, a set of drawings is provided. The drawings form an integral part of the description and illustrate an embodiment of the present invention, which should not be interpreted as restricting the scope of the invention, but just as an example of how the invention can be carried out. The drawings comprise the following figures:

FIG. 2A is a top perspective view of the temperature sensing unit of FIG. 1.

FIG. 2B is a top view of the temperature sensing unit of FIG. 1.

FIG. 2C is a side, diagrammatic view of the temperature sensing unit of FIG. 1.

FIG. 2D is an exploded top perspective view of the temperature sensing unit of FIG. 1.

DETAILED DESCRIPTION

The following description is not to be taken in a limiting sense but is given solely for the purpose of describing the broad principles of the invention. Embodiments of the invention will be described by way of example, with reference to the above-mentioned drawings showing elements and results according to the present invention.

Overall, the present application provides a temperature sensing unit that is included in or attachable to a vaporization device or a portion of a vaporization device, such as a carb cap. That is, in some implementations, the vaporization device includes a receptacle (e.g., banger, bowl, cup, nail, etc.) that may be heated by a heating element such as a handheld combustion or heating torch (for simplicity, referred to herein as "heating torch") and/or a heating coil. The receptacle receives the consumable to be heated by the heating element. The temperature sensing unit detects a temperature of an inner surface of the receptacle.

Regardless of the specific implementation, the temperature sensing unit is configured to sense a temperature of the inner surface of a receptacle which receives a consumable, which is the surface that directly heats the consumable. Directly detecting the temperature of the inner surface of the receptacle provides better control over the heating element and avoids burning the consumable as compared to sensors that detect a temperature of an exterior surface of the receptacle. For example, the temperature sensing unit may include a temperature sensor (e.g., an infrared thermometer, thermocouple, etc.) that can directly detect a temperature of an inner surface of the receptacle that is holding a consumable substance for vaporization. Additionally, the temperature sensing unit may include a display to provide feedback to the user relating to the temperature detected by the temperature sensing unit. For example, the display may show a detected temperature or provide indications of whether the temperature is within, above, or below a predetermined range (e.g., via colors, via phrases, like "too low," "just right," and "too high," and/or via any other indicia or indications). Additionally or alternatively, the feedback may cause the heating element to engage or disengage (i.e., heat the receptacle or stop heating the receptacle).

Figure 1:
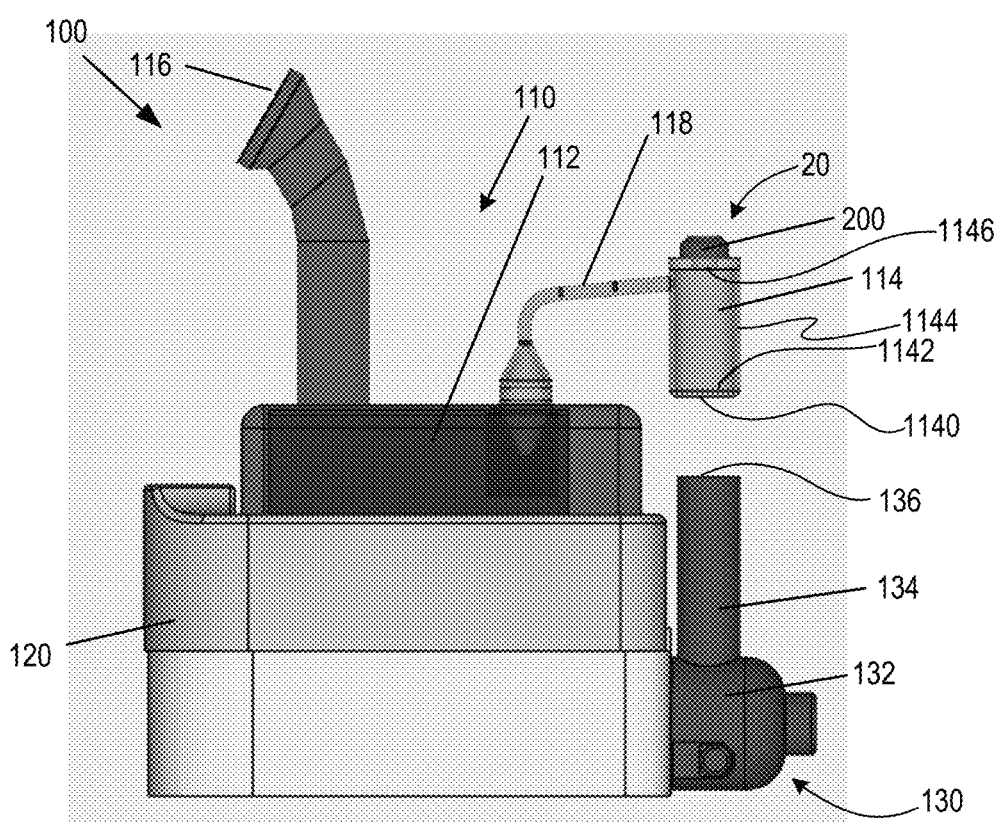
FIG. 1 is a side view of a vaporization device having a temperature sensing unit, according to an example embodiment.

Now referring to FIG. 1, a vaporization device 100 includes a temperature sensing unit 20 configured to detect a temperature of a portion of the vaporization device 100. In the depicted embodiment, the vaporization device 100 comprises for a vaporization rig 110, a housing 120, and a torch 130. The housing 120 receives and aligns the vaporization rig 110 and the torch 130. The vaporization rig 110 includes a base 112 defining an interior cavity configured to receive a liquid, a receptacle 114 (e.g., a banger, a bowl, a cup, a nail, etc.), a mouthpiece 116, and a neck 118 extending between the base 112 and receptacle 114. The neck 118 fluidly couples the receptacle 114 to the base 112. That is, the neck 118 includes an internal channel that fluidly couples the interior cavity of the base 112 with an interior of the receptacle 114. The interior cavity of the base 112 is also fluidly coupled with the mouthpiece 116. Thus, the receptacle 114 may serve as an inlet and the mouthpiece 116 may serve as an outlet of the vaporization rig 110. Accordingly, the vaporization rig 110 defines a pathway allowing vapor to pass through or adjacent to a liquid disposed in the cavity while flowing from the receptacle 114 to the mouthpiece 116.

The receptacle 114 includes a bottom wall or heatable portion 1140 and a sidewall 1144 extending from the heatable portion 1140 to a top portion 1146. The top portion 1146 defines an opening to a cavity of the receptacle 114. The heatable portion 1140 and the sidewall 1144 define the cavity configured to receive a consumable. At the bottom of the cavity, an inner surface 1142 of the heatable portion 1140 can receive, heat, and vaporize a consumable when the consumable is received in the cavity of the receptacle 114 and the heatable portion 1140 is heated.

The temperature sensing unit 20 is configured to detect a temperature of the inner surface 1142 of the receptacle 114. The temperature sensing unit 20 comprises a carb cap 200 configured to engage, cover, and/or rest on, the open top portion 1146 of the receptacle 114. In at least some embodiments, the temperature sensing unit 20 can also regulate a flow of air into the cavity of the receptacle 114. The temperature sensing unit 20 and the carb cap 200 are discussed in greater detail below, with reference to FIGS. 2A-2E.

Still referring to FIG. 1, the housing 120 is configured to receive and align the vaporization rig 110 and the torch 130. For example, in the depicted embodiment, the torch 130 includes a main body 132, a flame guide 134 extending laterally beside the main body 132, and a flame outlet 136 at a distal end of the flame guide 134. The torch 130 is configured to ignite and sustain a flame discharged from the flame outlet 136. When the base 112 of the vaporization rig 110 and the torch 130 are received in the housing 120, the flame outlet 136 is vertically aligned with the receptacle 114, such that the flame from the torch 130 contacts and heats and outer surface of the heatable portion 1140, which, in turn, heats the inner surface 1142 of the heatable portion 1140.

The vaporization device 100 depicted in FIG. 1 is only one example of a vaporization rig 110 that is usable with the temperature sensing unit 20 and, in other implementations, the main body 210 of the temperature sensing unit 20 can be sized and shaped to be received by a receptacle of any size and shape of any desired vaporization device or rig. Moreover, in some implementations, the vaporization device 100 does not include the housing 120, and the vaporization rig 110 is separate from the torch 130. For example, the vaporization rig 110 and torch 130 may be free-standing or held in a user's hands. In yet another implementation, the vaporization device 100 may not include the housing 120 or torch 130. Instead, a heating element (e.g., a heating coil) may be disposed on or otherwise coupled to the receptacle 114 and configured to heat the heatable portion 1140, and thus, the inner surface 1142. Regardless of the shape and size of the rig 110 and/or the arrangement between the heating element (e.g., torch 130, heating coil, etc.) and the receptacle 114, the temperature sensing unit 20 is configured to sense and determine a temperature of the inner surface 1142 of the receptacle 114.

FIGS. 2A-2E depict the temperature sensing unit 20. As can be seen, in the depicted embodiment the temperature sensing unit 20 is provided in the form of a carb cap 200. The carb cap 200 includes a main body 210 having a top surface 210A and a bottom portion 210B, a receiver 220, and an annular disk 230 surrounding, or concentric with, the receiver 220. The main body 210 has a generally cylindrical shape and a flange 212 extending radially from the bottom portion 210B. The flange 212 includes a top surface 212A and a bottom surface 212B. The receiver 220 extends from the bottom portion 210B of the main body and, more specifically, extends from the bottom surface 212B of the flange 212. In the depicted embodiment, the receiver 220 is defined by a cylindrical sidewall 222.

As can be seen best in FIG. 2A-2C, the main body 210 houses a temperature sensor 214, a display 216, and actuators 218 (e.g., buttons, toggles, and/or switches). The temperature sensor 214 is electrically coupled to the display 216 so that the display 216 can display data gathered by the temperature sensor 214 and/or indicia representative of data gathered by the temperature sensor 214. The actuators 218 are also electrically coupled to the temperature sensor 214 and/or the display 216 so that the actuators 218 can control the display 216 and/or the temperature sensor 214. In the depicted embodiment, the display 216 and the actuators 218 are disposed on the top surface 210A, with four actuators 218 disposed on opposing sides of the display 216. However, in other embodiments, the carb cap 200 may include any number of actuators 218 and/or any number of displays 216 arranged in any desired manner on the carb cap 200 (e.g., on main body 210).

Generally, positioning the temperature sensor 214 within the carb cap 200, which is configured to sit atop the receptacle of a nail/banger/cup/etc. of a rig (e.g., receptacle 114 of rig 110), allows the temperature sensor 214 to directly detect a temperature of the inner surface 1142 of receptacle 114 via a contactless sensor (e.g., an infrared sensor, laser sensor, etc.). Additionally or alternatively, the temperature sensor 214 may include a temperature probe extending from the receiver 220 (for example, see probe 340 in FIG. 3) that can directly contact and detect the temperature of the receptacle 114 (e.g., via a thermocouple, resistance temperature detector, etc.).

Figure 2E:
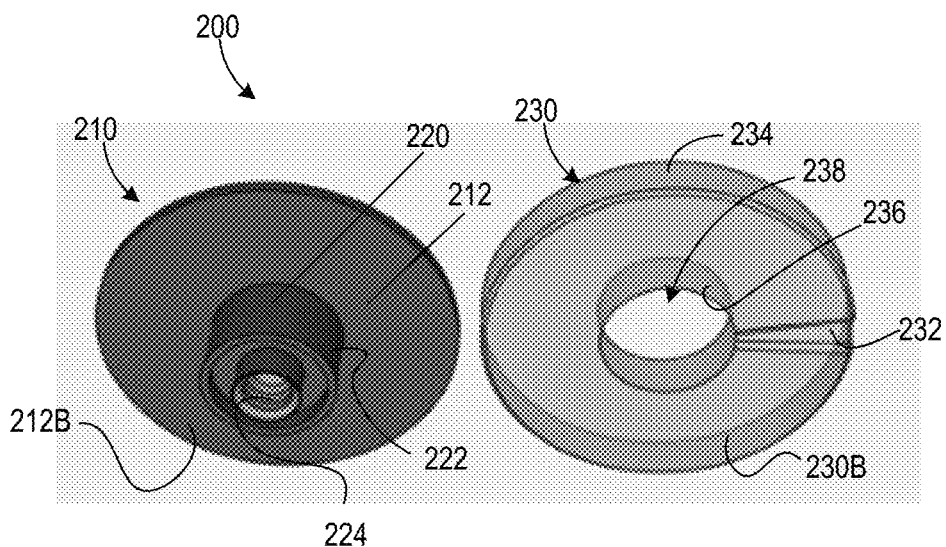
FIG. 2E is an exploded, bottom perspective view of the temperature sensing unit of FIG. 1.

As shown in FIG. 2E, the receiver 220 further includes a socket 224. The socket 224 may be an opening configured to allow the sensor 214 to detect the temperature of the receptacle 114. For example, the socket 224 may provide a field of view for the sensor 214 (e.g., for infrared or laser temperature detectors). In some implementations, the socket 224 may be a threaded opening for receiving an emitter or a detector for the sensor 214 (e.g., an infrared emitter/detector, a laser emitter/detector, etc.). In yet another implementation, the socket 224 may be a threaded opening configured to thermally or electrically couple the sensor 214 to a temperature probe (e.g., temperature probe 340 of FIG. 3). That is, the temperature probe may be configured to contact and conduct heat from the inner surface 1142 of the receptacle 114, or vaporizable substances disposed thereon, and the socket 224 conducts the heat and/or an electric signal indicative of the temperature to the sensor 214.

Although not shown, the main body 210 may further include a power source (e.g., a battery) and a controller for operating the display 216 and temperature sensor 214. In some implementations, the main body 210 may house a transmitter and a receiver for wireless communication between the temperature sensor 214 and a wireless device (e.g., a smart phone, a tablet, a computer, etc.) and/or a heating element. Accordingly, the temperature sensing unit 20 and heating element may be wirelessly controlled.

Now turning to FIGS. 2C-2E, the annular disk 230 is configured to support the main body 210 (and the carb cap 200 as a whole) on top of a nail/banger/cup/etc. of a rig, such as on the top portion 1146 of the receptacle 114 (see FIG. 1). Additionally, the annular disk 230 may, in at least some embodiments, regulate a flow of air into the cavity of the receptacle 114. As shown in FIGS. 2C-2E, the annular disk 230 includes a top surface 230A and a bottom surface 230B opposite the top surface 230A that are each bounded by an outer sidewall 234 and an inner sidewall 236 that defines an opening 238. Moreover, in the depicted embodiment, the bottom surface 230B includes at least one groove 232. The at least one groove 232 extends radially inward from the outer sidewall 234 along the bottom surface 230B to the inner sidewall 236. As depicted in FIG. 2E, in the depicted embodiment, the groove 232 has a frustoconical shape. That is, a width of the groove 232 along the bottom surface 230B increases as the groove 232 extends radially outward from the inner sidewall 236 to the outer sidewall 234. Similarly, a depth of the groove 232 that extends into the bottom surface 230B increases as the groove 232 extends radially outward from the inner sidewall 236 to the outer sidewall 234. Said another way, a depth and width of the groove 232 at the outer sidewall 234 is greater than a depth and width of the groove 232 at the inner sidewall 236. However, this is merely an example and in other embodiments the groove 232 may have any shape, size, and/or dimensions. For example, in some implementations, the groove 232 has a constant width and depth between the outer sidewall 234 and the inner sidewall 236.

The bottom surface 230B of the annular disk 230 is configured to mate with, or rest on, the top portion 1146 of the receptacle 114. Then, the top portion 1146 and the at least one groove 232 can cooperate to form a fluid channel fluidly coupled with the cavity of the receptacle 114. In some implementations, the at least one groove 232 and top portion 1146 regulate a flow air into the receptacle 114. For example, the at least one groove 232 and top portion 1146 may regulate a flow rate of the flow of air (e.g., by leveraging air flow phenomenon, such as the venturi effect). In some implementations, the annular disk 230 includes a plurality of grooves 232. In some implementations, the bottom surface 230B may be shaped or include surface features configured to engage the top portion 1146 and prevent lateral movement of the annular disk 230 with respect to the receptacle 114.

Meanwhile, the annular disk 230 is also configured to receive and support the main body 210 of the carb cap 200. For example, in the depicted embodiment, the opening 238 of the annular disk 230 receives the receiver 220 of the main body 210, and top surface 230A mates with the bottom surface 212B of the flange 212. That is, the inner sidewall 236 defining opening 238 abuts at least a portion of a sidewall 222 of the receiver 220, thereby preventing radial or lateral movement of the main body 210 with respect to the annular disk 230. However, in other embodiments, the carb cap need not include an annular disk 230 and can engage a nail receptacle, such as receptacle 114 in any desired manner. Put generally, with or without disk 230, the carb cap 200 presented herein can fully or partially cover a receptacle for a vaporizable substance, with or without sealing one or more connection points between the carb cap and the receptacle.

Figure 3:
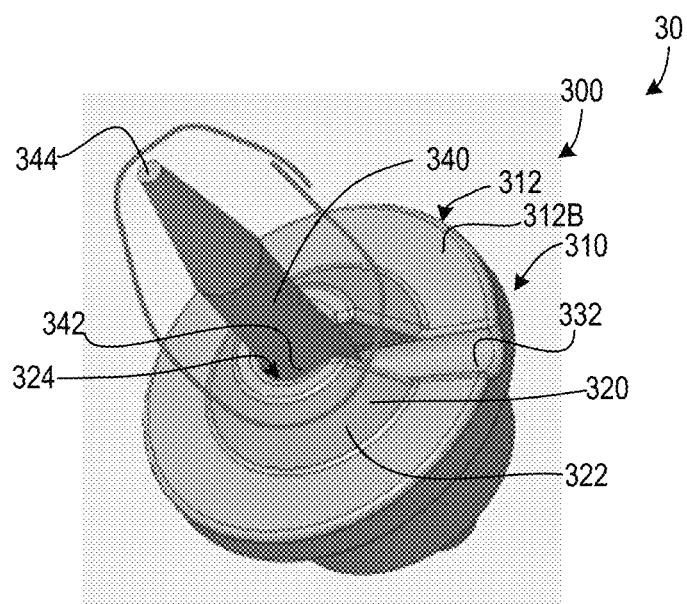
FIG. 3 is a bottom perspective view of a temperature sensing unit according to a second example embodiment.

Now referring to FIG. 3, a bottom perspective view of a temperature sensing unit 30 according to a second embodiment is shown. For brevity, only differences between temperature sensing unit 30 and temperature sensing unit 20 will be described. Temperature sensing unit 30 is substantially similar to temperature sensing unit 20, except temperature sensing unit 30 does not include an annular disk 230. More specifically, the temperature sensing unit 30 includes a carb cap 300 having a main body 310, a flange 312 extending radially outward from the main body 310, a bottom surface 312B and a receiver 320 extending from the bottom surface 312B. The receiver 320 includes a socket 324 extending axially through the receiver 320 that is configured to receive a temperature probe 340.

The carb cap 300 directly engages a receptacle of a vaporization device without an annular disk (e.g., annular disk 230 of FIGS. 2A-2E). For example, the receiver 320 and flange 312 may engage a top portion of the receptacle. The receiver 320 has a frustoconical shape defined by a sidewall 322 that extends obliquely from the bottom surface 312B. The frustoconical shape of the receiver 320 may center and maintain the carb cap 300 when received on the receptacle. The bottom surface 312B of the flange 312 may mate with or rest on a top portion of the receptacle and support the main body 310.

The bottom surface 312B includes a groove 332 that extends radially inward from an outer perimeter of the flange 312 to the receiver 320. In the depicted embodiment, the groove 332 extends through the receiver 320 to the socket 324. When the carb cap 300 is disposed on a receptacle of a vaporization device, the at least one groove 332 is configured to admit and regulate a flow air into the receptacle. In some implementations, the bottom surface 312B includes a plurality of grooves 332 arranged radially about the receiver 320. In some implementations, the bottom surface 312B may be shaped to define or may include surface features configured to engage a top portion of the receptacle and prevent lateral movement of the main body 310 with respect to the receptacle. Consequently, the temperature probe 340 may be aligned with a desired inner surface of the receptacle.

During operation, the temperature probe 340 is configured to thermally couple an inner surface of a receptacle of a vaporization device with a sensor disposed in the main body 310 of the carb cap 300. The temperature probe 340 includes a proximal end 342 and a distal end 344. The distal end 344 is configured to be in close proximity to or in contact with an inner surface of a receptacle of a vaporization device (e.g., vaporization rig 110 of FIG. 1). That is, the distal end 344 is thermally coupled to the inner surface of the receptacle. The temperature probe 340 is configured to conduct heat from the inner surface of the receptacle to the distal end 344. The distal end 344 is configured to conduct the heat to the socket 324, and the socket 324 is configured to conduct the heat to the sensor in the main body 310. The sensor is configured to determine a temperature of the inner surface based on the conducted heat. Accordingly, the temperature sensing unit 30 can accurately detect a temperature of an inner surface of a receptacle.

In some implementations, the temperature probe 340 maybe electrically coupled to the sensor via the socket 324. For example, the probe 340 may contact the inner surface of the receptacle and generate an electrical signal indicative of the temperature of the inner surface. The electrical signal may be transmitted through the socket 324 to the sensor, which determines the temperature of the inner surface based on the received signal. Alternatively, the temperature probe 340 may thermally couple to the socket 324 and the socket may be configured to conduct an electrical signal to the sensor that is indicative of a temperature of the inner surface of the receptacle. Then, the sensor may determine the temperature of the inner surface based on the received signal.

The socket 324 may be a threaded hole or opening configured to engage threads of the temperature probe 340. For example, a proximal end 342 of the probe 340 may be threaded to engage threads of the socket 324. In some implementations, the temperature probe 340 may integrally extend from a bottom surface 312B of the main body 310.

In some implementations, the temperature probe 340 may have a predetermined length based on a depth of a cavity of a receptacle. In some implementations, the temperature probe 340 may be interchangeable with temperature probes of different lengths corresponding to receptacles of different depths. For example, the temperature probe 340 may be removable and have a first length based on a depth of a first receptacle. The temperature probe 340 maybe removed and replaced with a second temperature probe that is substantially the same as temperature probe 340, but has a different length based on a depth of a second receptacle. Accordingly, the temperature sensing unit 30 may be used with different receptacles of different vaporization device by changing the temperature probe 340. In some implementations, the temperature probe 340 may be flexible, telescoping, and/or otherwise extendible. In some implementations, the temperature probe 340 may be irregularly shaped, arcuately shaped, and/or pivotable. Additionally or alternatively, the socket 324 could be pivotable, flexible, etc., to achieve a similar effect. Put generally, a desired temperature probe 340 may be selected and arranged to contact any desired inner surface of any receptacle.

Overall, the temperature sensing unit 20, 30 described herein provides accurate detection of a temperature of an inner surface of a receptacle configured to heat and vaporize a consumable. Additionally, the temperature sensing unit 20, 30 may be reconfigurable to interchangeably engage various vaporization devices and heating elements.

While the temperature sensing unit presented herein has been illustrated and described in detail and with reference to specific embodiments thereof, it is nevertheless not intended to be limited to the details shown, since it will be apparent that various modifications and structural changes may be made therein without departing from the scope the inventions and within the scope and range of equivalents of the claims. In addition, various features from one of the embodiments may be incorporated into another of the embodiments. Accordingly, it is appropriate that the appended claims be construed broadly and in a manner consistent with the scope of the disclosure as set forth in the following claims.

It is also to be understood that the temperature sensing unit and vaporization device presented herein, or portions thereof, may be fabricated from any suitable material or combination of materials, provided that the device, or portions thereof, can function as described herein (i.e., withstand heating forces and form sealed connections). Example materials include plastic, foamed plastic, quartz, glass, metal, supple natural or synthetic materials including, but not limited to, cotton, elastomers, polyester, plastic, rubber, derivatives thereof, and combinations thereof. Suitable plastics may include high-density polyethylene (HDPE), low-density polyethylene (LDPE), polystyrene, acrylonitrile butadiene styrene (ABS), polycarbonate, polyethylene terephthalate (PET), polypropylene, ethylene-vinyl acetate (EVA), or the like. Suitable foamed plastics may include expanded or extruded polystyrene, expanded or extruded polypropylene, EVA foam, derivatives thereof, and combinations thereof.

Reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above", "below", "upper", "lower", "top", "bottom", "left," "right," "front," "rear," "side," "height," "length," "width," "interior," "exterior," "inner," "outer" or other similar terms merely describe points of reference and do not limit the present invention to any particular orientation or configuration. When used to describe a range of dimensions and/or other characteristics (e.g., time, pressure, temperature, distance, etc.) of an element, operations, conditions, etc. the phrase "between X and Y" represents a range that includes X and Y.

Further, the term "exemplary" is used herein to describe an example or illustration. Any embodiment described herein as exemplary is not to be construed as a preferred or advantageous embodiment, but rather as one example or illustration of a possible embodiment.

Further, the present disclosure may repeat reference numerals and/or letters in the various examples. This repetition is for the purpose of simplicity and clarity, and does not in itself dictate a relationship between the various embodiments and/or configurations discussed.

When used herein, the term "comprises" and its derivations (such as "comprising", "including," "containing," etc.) should not be understood in an excluding sense, that is, these terms should not be interpreted as excluding the possibility that what is described and defined may include further elements, steps, etc. Meanwhile, when used herein, the term "approximately" and terms of its family (such as "approximate", etc.) should be understood as indicating values very near to those which accompany the aforementioned term. That is to say, a deviation within reasonable limits from an exact value should be accepted, because a skilled person in the art will understand that such a deviation from the values indicated is inevitable due to measurement inaccuracies, etc. The same applies to the similar terms, such as, but not limited to, "about," "around," and "substantially."

As used herein, unless expressly stated to the contrary, use of the phrase "at least one of", "one or more of", "and/or", and variations thereof are open-ended expressions that are both conjunctive and disjunctive in operation for any and all possible combination of the associated listed items. For example, each of the expressions "at least one of X, Y and Z", "at least one of X, Y or Z", "one or more of X, Y and Z", "one or more of X, Y or Z" and "X, Y and/or Z" can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z. Further as referred to herein, "at least one of" and "one or more of" can be represented using the "(s)" nomenclature (e.g., one or more element(s)).

Additionally, unless expressly stated to the contrary, the terms "first", "second", "third", etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, "first X" and "second X" are intended to designate two "X" elements that are not necessarily limited by any order, rank, importance, temporal sequence, or hierarchy of the two elements.

The invention claimed is:

1. A vaporization device comprising:
   a main body;
   a nail including a nail receptacle for an inhalable substance and defining a heatable portion;
   a mouthpiece in fluid communication with the nail receptacle to allow vapor to pass from the nail receptacle to the mouthpiece;
   a heating element aligned with the heatable portion; and
   a carb cap configured to removably engage the nail receptacle, the carb cap including a temperature sensor disposed therein or thereon and configured to detect a temperature of an inner surface of the nail receptacle while the carb cap is covering the nail receptacle.

2. The vaporization device of claim 1, wherein the temperature sensor detects the temperature of a portion of the nail receptacle proximate to the heatable portion.

3. The vaporization device of claim 1, wherein the main body is configured to receive a liquid and defines pathways through or adjacent to the liquid that allow the vapor to pass from the nail receptacle to the mouthpiece.

4. The vaporization device of claim 1, wherein the carb cap further comprises:
   a display configured to display the temperature detected by the temperature sensor; and
   a battery configured to power the temperature sensor and the display.

5. A vaporization device comprising:
- a carb cap configured to cover a nail receptacle defined by a nail, the nail receptacle being configured to hold a consumable; and
- a temperature sensor disposed in or on the carb cap and configured to detect a temperature of an inner surface of the nail receptacle while the carb cap is covering the nail receptacle.

6. The vaporization device of claim 5, wherein the temperature sensor comprises a contactless temperature sensor.

7. The vaporization device of claim 5, wherein the carb cap comprises:
- an annular disk having a fluid channel, the annular disk configured to align the temperature sensor with the nail, and guide fluid into the nail receptacle via the fluid channel.

8. The vaporization device of claim 5, wherein the carb cap further comprises:
- a main body; and
- a temperature probe coupled to the temperature sensor, wherein the temperature probe extends from the main body towards the inner surface of the nail receptacle while the carb cap is covering the nail receptacle.

9. The vaporization device of claim 8, wherein the main body further comprises a threaded hole, and a proximal end of the temperature probe is threaded into the threaded hole.

10. The vaporization device of claim 8, wherein the temperature probe is configured to contact at least one of the inner surface of the nail receptacle and the consumable while the carb cap is covering the nail receptacle.

11. The vaporization device of claim 8, wherein the carb cap further comprises:
- a display configured to display the temperature of the inner surface detected by the temperature sensor.

12. The vaporization device of claim 11, the carb cap further comprises one or more actuators disposed on the main body that are configured to control at least one of the temperature sensor and the display.

13. The vaporization device of claim 11, further comprising:
- a battery disposed in the main body and configured to power the display and the temperature sensor.

14. A carb cap for a vaporization device comprising:
- a main body;
- a flange extending radially from the main body;
- a receiver extending axially from the main body;
- a temperature sensor disposed in or on the main body;
- an annular disk configured to be concentric with the receiver; and
- a groove extending radially along a portion of the annular disk, wherein the temperature sensor is configured to detect a temperature of at least one of an inner surface of a nail receptacle and a consumable disposed in the nail receptacle when the annular disk is covering the nail receptacle such that the groove provides a lone pathway into and out of the nail receptacle.

15. The carb cap of claim 14, further comprising a display configured to display a temperature detected by the temperature sensor.

16. The carb cap of claim 14, wherein the temperature sensor is a contactless temperature sensor.

17. The carb cap of claim 14, wherein the receiver comprises a threaded hole configured to:
- receive a proximal end of a temperature probe, and
- thermally and/or electrically couple the temperature probe to the temperature sensor.

18. The carb cap of claim 17, wherein:
- the temperature probe axially extends from the threaded hole; and
- the temperature probe is configured to contact at least one of the inner surface of the nail receptacle and the consumable disposed in the nail receptacle.

19. The carb cap of claim 14, wherein the annular disk is further configured to align the temperature sensor with a nail of the vaporization device.

* * * * *